United States Patent
Singh

(10) Patent No.: US 9,921,131 B2
(45) Date of Patent: Mar. 20, 2018

(54) $NO_x$ MODEL

(71) Applicant: International Engine Intellectual Property Company, LLC, Lisle, IL (US)

(72) Inventor: Navtej Singh, Arlington Heights, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 190 days.

(21) Appl. No.: 13/870,482

(22) Filed: Apr. 25, 2013

(65) Prior Publication Data

US 2014/0318216 A1    Oct. 30, 2014

(51) Int. Cl.
*G01M 15/10* (2006.01)
*F02D 41/24* (2006.01)
(Continued)

(52) U.S. Cl.
CPC ....... *G01M 15/102* (2013.01); *F02D 41/1462* (2013.01); *F02D 41/2416* (2013.01);
(Continued)

(58) Field of Classification Search
CPC ..... F02D 2041/1436; F02D 2200/0602; F02D 2200/0614; F02D 2200/101;
(Continued)

(56) References Cited

U.S. PATENT DOCUMENTS 6,119,449 A * 9/2000 Kohler ............... F01N 3/0842
                                                          60/274
6,775,623 B2 * 8/2004 Ali ..................... G01N 33/0037
                                                          123/435
(Continued)

FOREIGN PATENT DOCUMENTS

DE         10148663 A1    4/2003
DE    102009021387 A1    9/2010
(Continued)

OTHER PUBLICATIONS

Engine Calibration: multi objective constrained optimization of engine maps.
(Continued)

*Primary Examiner* — Freddie Kirkland, III
(74) *Attorney, Agent, or Firm* — Jack D. Nimz; Jeffrey P. Calfa

(57) ABSTRACT

Methods are provided for estimating the $NO_x$ content of exhaust gas produced by an internal combustion engine. The method includes determining one or more operating parameters. The method further includes applying the determined operating parameter(s) to a global $NO_x$ model. The global $NO_x$ model may be derived using a plurality of steady state data points relating to local $NO_x$ emission models. The steady state data points may be derived using a plurality of set and variable operating parameters. The global $NO_x$ model allows for prediction of the engine-out $NO_x$ content of exhaust gas in real time and without a $NO_x$ sensor, even if engine operating parameters change.

6 Claims, 5 Drawing Sheets

(51) Int. Cl.
*F02D 41/00* (2006.01)
*F02D 41/14* (2006.01)

(52) U.S. Cl.
CPC ........ *G01M 15/104* (2013.01); *G01M 15/106* (2013.01); *F02D 41/0065* (2013.01); *F02D 41/144* (2013.01); *F02D 2041/1436* (2013.01); *F02D 2200/0602* (2013.01); *F02D 2200/0614* (2013.01); *F02D 2200/101* (2013.01); *F02D 2200/602* (2013.01)

(58) Field of Classification Search
CPC ........... F02D 2200/602; F02D 41/0065; F02D 41/144; F02D 41/1462; F02D 41/2416; G01M 15/102; G01M 15/104; G01M 15/106
USPC ............................................ 73/23.31, 114.01
See application file for complete search history.

(56) References Cited

U.S. PATENT DOCUMENTS

| | | | | |
|---|---|---|---|---|
| 7,676,318 B2* | 3/2010 | Allain | .................. | F02D 41/021 701/103 |
| 7,779,680 B2* | 8/2010 | Sasaki | ................ | F02D 41/1462 73/114.71 |
| 8,301,356 B2* | 10/2012 | Wang | .................. | F02D 35/026 123/435 |
| 8,635,030 B2* | 1/2014 | Zanetti | .................... | F01N 3/208 60/276 |
| 8,825,343 B2* | 9/2014 | Yamada | ................ | F02D 35/024 123/478 |
| 8,899,018 B2* | 12/2014 | Frazier | .................... | F01N 3/208 60/285 |
| 8,915,063 B2* | 12/2014 | Auckenthaler | ....... | F02D 41/005 60/276 |
| 8,942,912 B2* | 1/2015 | Wang | .................. | F02D 41/1462 123/703 |
| 2007/0150424 A1 | 6/2007 | Igelnik | | |
| 2009/0183551 A1* | 7/2009 | Fattic | .................... | F01N 3/0842 73/23.31 |
| 2011/0214650 A1* | 9/2011 | Wang | ..................... | F02D 41/00 123/703 |
| 2013/0024089 A1* | 1/2013 | Wang | .................. | F02D 41/1462 701/102 |
| 2013/0085733 A1* | 4/2013 | Vartia | ................ | F02D 41/1462 703/7 |

FOREIGN PATENT DOCUMENTS

| | | |
|---|---|---|
| DE | 102009036060 A1 | 10/2010 |
| EP | 1529941 A2 | 5/2005 |
| EP | 1529941 A3 | 8/2010 |
| EP | 2259194 A2 | 12/2010 |
| EP | 2259194 A3 | 10/2012 |

OTHER PUBLICATIONS

Design of computer controlled combustion engines.
European Search Report dated Jul. 22, 2015.

* cited by examiner

NO$_x$ MODEL

BACKGROUND

Selective catalytic reduction (SCR) is commonly used to remove NO$_x$ (i.e., oxides of nitrogen) from the exhaust gas produced by internal combustion engines, such as diesel or other lean burning (gasoline) engines. In such systems, NO$_x$ may be continuously removed from the exhaust gas by injection of a reductant into the exhaust gas prior to the exhaust gas encountering an SCR catalyst that is capable of achieving a high conversion of NO$_x$.

According to certain systems, the reductant may be introduced into the exhaust gas by controlled injection, such as, for example, the controlled injection of gaseous ammonia, aqueous ammonia, or aqueous urea. Aqueous urea that is dosed into the exhaust stream may hydrolyses to gaseous ammonia. Alternatively, gaseous ammonia may be delivered into the exhaust gas stream through the use of an ammonia storage and delivery system, which utilizes high density storage to accommodate ammonia in solid form. With the different types of systems for introducing reductant into the exhaust gas, the SCR catalyst, which is positioned in the exhaust gas stream, causes a reaction between NO$_x$ present in the exhaust gas and a NO$_x$ reducing agent (e.g., ammonia) to convert the NO$_x$ into nitrogen and water.

Proper operation of the SCR system involves precise control of the amount (i.e., dosing level) of ammonia (or other reductant) that is injected into the exhaust gas stream. For example, injection of too much reductant may cause a slip of ammonia in the exhaust gas, whereas injection of too little reductant may cause a less than optimal conversion of NO$_x$.

SCR systems often utilize NO$_x$ sensors in order to determine proper reductant dosing levels. For example, a NO$_x$ sensor can be positioned in the exhaust stream between the engine and the SCR catalyst for estimating or detecting the content of NO$_x$ that is in the exhaust gas that is being emitted from the engine, also referred to as engine-out NO$_x$ level. Such a NO$_x$ sensor is commonly referred to as an engine-out NO$_x$ sensor or an upstream NO$_x$ sensor. An engine control unit can use the output from the engine-out NO$_x$ sensor to determine the amount of reductant that should to be injected into the exhaust stream.

Commercially available NO$_x$ sensors are expensive and have other operational drawbacks. For example, NO$_x$ sensors may have a measuring range of 100-1500 parts per million with an accuracy of plus or minus 15%. Additionally, the accuracy of NO$_x$ sensors can be affected by environmental and/or operating conditions such as dew point, system voltage, and oxygen concentration, among other drawbacks. In this regard, some NO$_x$ sensors only work properly when the exhaust gas is above a threshold temperature, which may be on the order of 125° C.-130° C. As a result, NO$_x$ sensors may not suitable for determining dosing levels during certain engine operating conditions, such as during low idle conditions or engine warm-up. Additionally, the inclusion of NO$_x$ sensors, in addition to other sensors used in connection with On-Board Diagnostics requirements, may translate into additional sensor implementation costs. Further, efforts are typically required to avoid NO$_x$ sensors from being positioned where the electronics of the NO$_x$ sensors may be exposed to high exhaust gas temperatures and dew point exposure, which may otherwise translate into increased warranty and maintenance costs.

SUMMARY

Aspects and embodiments of the present technology described herein relate to a method for estimating an engine-out NO$_x$ content of exhaust gas produced by an internal combustion engine. The method includes determining an engine speed, an engine load, an intake oxygen level, a fuel pressure, and a fuel quantity. The method further includes applying, by a control unit, the determined engine speed, engine load, intake oxygen level, fuel pressure, and fuel quantity to a NO$_x$ model to arrive at an estimate of the engine-out NO$_x$ content.

Additionally, aspects and embodiments of the present technology described herein relate to a method for estimating an engine-out NO$_x$ content of exhaust gas produced by an internal combustion engine. The method includes determining a plurality of local NO$_x$ emission models and deriving a global NOx emission model based on the plurality of local NO$_x$ emission models. The method further includes determining a plurality of variable operating parameters and applying, by a control unit, the plurality of variable operating parameters to the global NOx emission model to estimate the engine-out NO$_x$ content.

DETAILED DESCRIPTION

Figure 1:
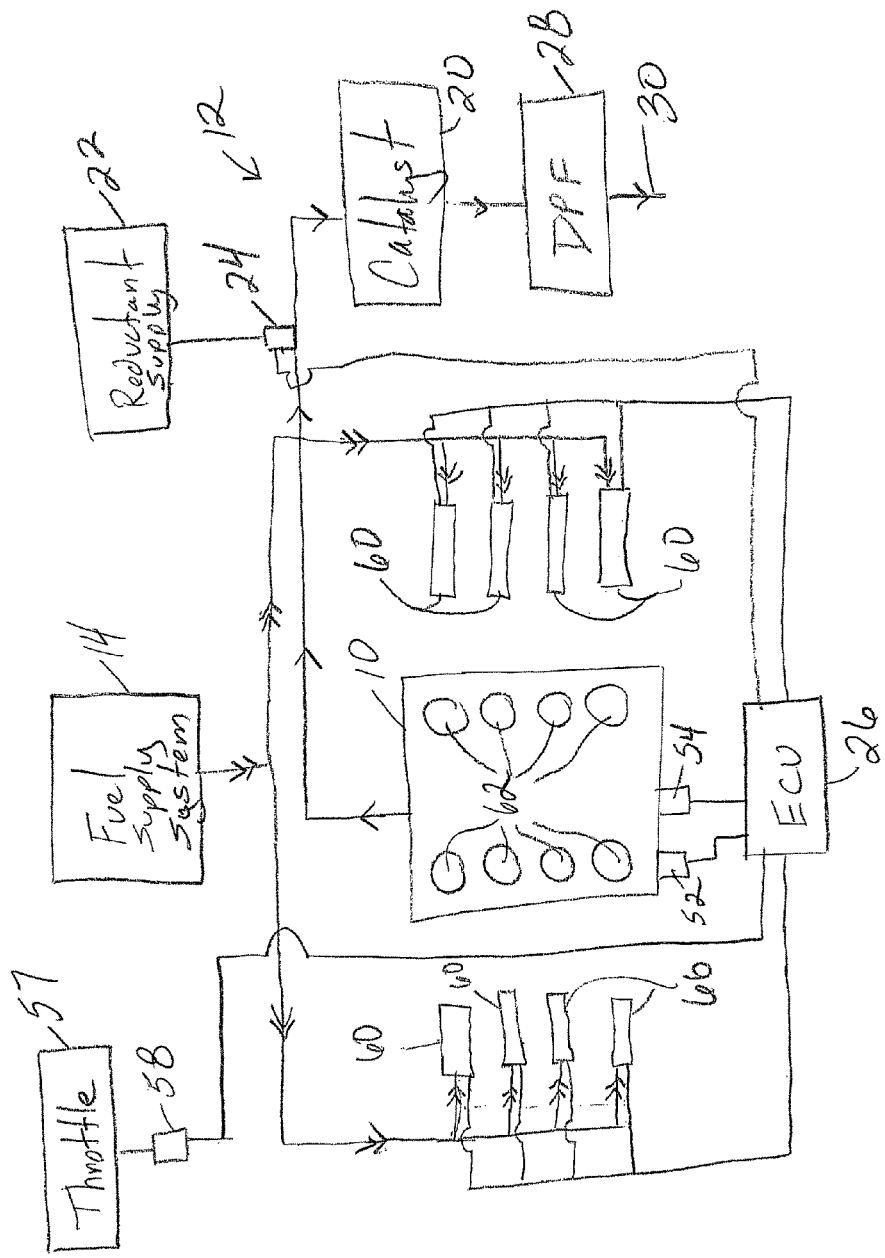
FIG. 1 illustrates an exemplary schematic depiction of an internal combustion engine and an SCR system for reducing NO$_x$ from exhaust gas generated by operation of the engine.

FIG. 1 illustrates an exemplary schematic depiction of an internal combustion engine 10 and an SCR system 12 for reducing NO$_x$ from exhaust gas generated by operation of the engine 10. The engine 10 can be used, for example, to power a vehicle such as an over-the-road vehicle (not shown). The engine 10 can be a compression ignition engine, such as, for example, a diesel engine, including light-duty and heavy-duty diesel engines, among others, that receives fuel from a fuel supply system 14. The SCR system 12 includes a catalyst 20, a reductant supply 22, and a reductant injector 24.

A control unit 26 or other control module (collectively referred to as ECU) is configured to control the delivery of a reductant, such as ammonia, from the reductant supply 22 and into the exhaust gas through the reductant injector 24. According to certain embodiments, the reductant supply 22 may include one or more canisters that store ammonia in solid, liquid, or gaseous form. Further, according to certain systems, the one or more canisters may, upon depletion of the ammonia contained therein, be replaced with other canisters and/or recharged to replenish at least a portion of the previously consumed ammonia. In such systems, the reductant supply 22 may also include a heating jacket that is positioned around the canister(s) and which is configured to elevate the temperature of the solid ammonia in the canister(s) to a sublimation temperature. Further, according to such systems, ammonia in the reductant supply 22, such as ammonia in the canisters that has been converted to a gaseous state, may be directed from the reductant supply 22 and to the reduction injector 24.

The reductant injector 24 is positioned in or adjacent to the exhaust system upstream from the catalyst 20, and is configured to inject reductant from the reductant supply 22 into the exhaust gas stream. As the ammonia is injected into the exhaust system, the ammonia mixes with the exhaust gas to provide a diesel exhaust fluid that flows through the catalyst 20. The catalyst 20 is configured to cause a reaction between $NO_x$ present in the exhaust gas and a $NO_x$ reducing agent (e.g., ammonia) to reduce/convert the $NO_x$ into nitrogen and water, which then passes out of the tailpipe 30 and into the environment. According to certain embodiments, exhaust gas may also flow through a diesel particulate filter (DPF) 28 before being released into the environment through a tailpipe 30.

In addition to controlling the dosing or metering of ammonia, the ECU 26 can also store information such as the amount of ammonia being delivered to the exhaust gas, the canister providing the ammonia, the starting volume of deliverable ammonia in the canister, and other such data which may be relevant to determining the amount of deliverable ammonia in each canister. The information may be monitored on a periodic or continuous basis. When the ECU 26 determines that the amount of deliverable ammonia is below a predetermined level, a status indicator (not shown) that is electronically connected to the ECU 26 may be activated.

While the SCR system 12 has been described in the context of solid ammonia, it will be appreciated that the SCR system 12 could alternatively use, for example, a reductant such as pure anhydrous ammonia, aqueous ammonia, or urea.

The ECU 26 controls operation of the SCR system 12, including operation of the reductant injector 24, based on a plurality of operating parameters. As explained in greater detail, the engine-out $NO_x$ level is determined or predicted by the ECU 26, or other control module, using a global $NO_x$ emission model that utilizes one or more engine operating parameters. For example, in the exemplary embodiment, the global $NO_x$ emission model may employ a mathematical formula that utilizes one or more of the following operating parameters: fuel pressure (FuP), engine speed (N) (i.e., rotational speed), engine load or torque (L), the start of injection timing (SOI), the fuel quantity ($m_f$) involved in the injection(s), and oxygen concentration, among other possible parameters. The fuel pressure (FuP) may be determined via a pressure sensor 52 that is operably positioned to sense the pressure in the engine's intake manifold and produce a responsive output signal. Engine speed (N) may be determined using a sensor 54 to detect the rotational speed of the engine, e.g., crankshaft revolutions per minute (rpm). According to certain embodiments, engine load or torque (L) can be based on the position of an accelerator pedal or throttle 57, as measured by a sensor 58 or fuel setting, for example. Further, as the operation of fuel injectors 60 are typically controlled by the ECU 26, the SOI and fuel quantity may be determined by the ECU 26 based on the timing and/or duration that a fuel injector 60 is operated.

The primary function governing $NO_x$ formation may be expressed by the following equations.

$$O+N_2 \leftrightarrow NO+N \qquad (Eq.\ 1)$$

$$N+O_2 \leftrightarrow NO+O \qquad (Eq.\ 2)$$

$$OH+N \leftrightarrow NO+H \qquad (Eq.\ 3)$$

Further, based on chemical kinetics, the rate of $NO_x$ formation ($\{D[NO]/DT\}$) may be derived by the following equation:

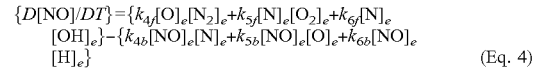

$$\{D[NO]/DT\} = \{k_{4f}[O]_e[N_2]_e + k_{5f}[N]_e[O_2]_e + k_{6f}[N]_e[OH]_e\} - \{k_{4b}[NO]_e[N]_e + k_{5b}[NO]_e[O]_e + k_{6b}[NO]_e[H]_e\} \qquad (Eq.\ 4)$$

where: $k_{4f}$ and $k_{4b}$ are the forward and backward reaction rates, respectively, of above equation (1); $k_{5f}$ and $k_{5b}$ are the forward and backward reaction rates, respectively, of above equation (2); $k_{6f}$ and $k_{6b}$ are the forward and backward reaction rates, respectively, of above equation (3); $[O]_e$ is the equilibrium species concentration; $[O_2]_e$ is the equilibrium oxygen species concentration; $[N]_e$ is the species concentration; $[N_2]_e$ is the species concentration; $[NO]_e$ is the species concentration; $[H]_e$ is the species concentration; and $[OH]_e$ is the species concentration.

Using a steady state approximation and equilibrium assumption, the $NO_x$ formation recited in above Eq. 4 may be reduced to:

$$d\frac{[Nox]}{dt} = \frac{6 \leftarrow 10^{16}}{T^{0.3}} * e^{(-69000/T)} * [O_2]_e^{0.3}[N_2] \qquad (Eq.\ 5)$$

where $$d\frac{[Nox]}{dt}$$

is the nitrogen oxide (NO) formation rate, T is the temperature in the engine cylinder 62, and the first instance of e (stated with respect to $e^{(-69000/T)}$) is activation energy in the cylinder 62 for the formation of $NO_x$.

Figure 2:
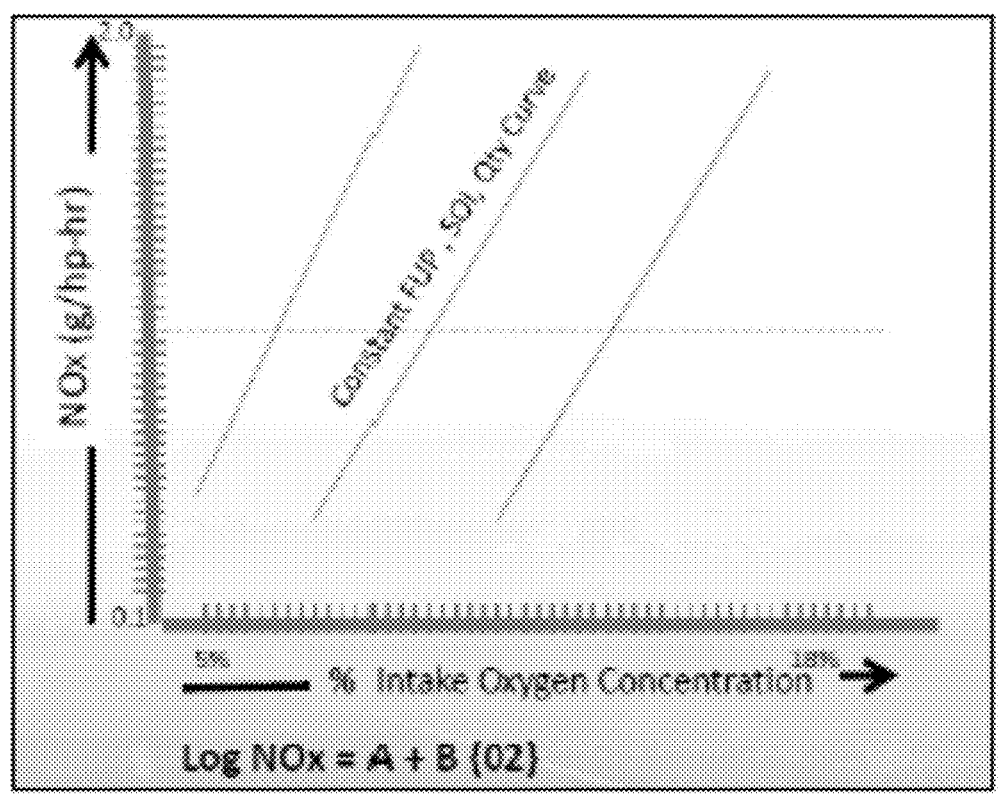
FIG. 2 provides a chart illustrating the formation of in-cylinder NO$_x$ being directly proportional to available inlet oxygen concentration.

As shown above by Eq. 5, the formation of in-cylinder $NO_x$ is directly proportional to available inlet oxygen concentration ($O_2$). More specifically, Eq. 5 indicates that there is a linear logarithmic relationship between engine-out $NO_x$ and the intake oxygen concentration for given engine operating parameters. This linear relationship is demonstrated in FIG. 2, where fuel pressure (FuP), start of injection/injection timing (SOI), and fuel quantity ($m_f$) have been held, in three different instances, constant. Moreover, the three lines in the chart of FIG. 2 reflect the use of data from three different constant, FuP, SOI, and $m_f$ values. Thus, knowing which one of the three constant FuP, SOI, and $m_f$ values apply to the given situation, the engine-out $NO_x$ concentration may be determined by knowing the intake oxygen concentration. Moreover, according to certain embodiments, the engine-out $NO_x$ concentration may be predicted based upon the intake oxygen concentration for a constant fuel pressure (FuP), start of injection/injection timing (SOI), and fuel quantity ($m_f$).

However, in at least certain engines, during operation, at least some operating parameters within the engine cylinder 62, such as fuel pressure, start of injection, and fuel quantity, among others, are often not constant. Accordingly, certain embodiments of the present technology provide for the prediction or determination of the level of $NO_x$ being generated by an internal combustion engine, without requiring the use of a $NO_x$ sensor and using variable engine operating parameters. For example, according to certain embodiments, the level of $NO_x$ being generated by an internal combustion engine may be determined using variable parameters that may include, but are not limited to, one or more of the following: engine speed (N); engine load (L); the concentration of the oxygen introduced into the cylinder 62 for the combustion event, also referred to as the intake oxygen concentration ($O_2$); fuel pressure (FuP); start of injection/injection timing (SOI); and the fuel quantity ($m_f$). By using such variables, the $NO_x$ emission model provided by the present technology is not constrained to input factors that are used as calibration set point tables. Moreover, by utilizing the actual variable parameters, rather than assuming such variables are constant, the model of the present technology provides for real time determination of $NO_x$ emission levels.

Figure 3:
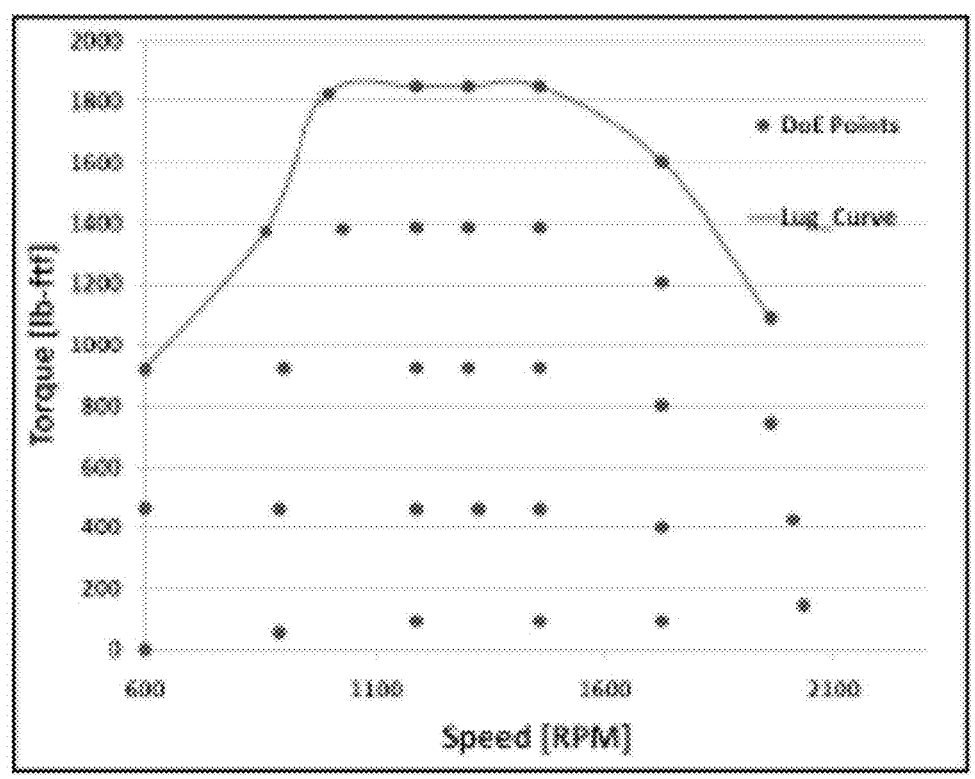
FIG. 3 illustrates steady state data points provided by the application of the design of experiments method to create local NO$_x$ emission response surface models as a function of engine speed and load/torque.

Referencing FIG. 3, the design of experiments (DOE) method may be applied to map emission response surface models as a function of engine speed and load/torque, with calibration parameters also being used as set point tables in the control strategy. The steady state data points mapped in FIG. 3 reflect the different results of local $NO_x$ emission modeling. Moreover, the local $NO_x$ emission modeling is generated using particular set operating parameters, in this instance engine speed and load/torque, and corresponding values for other, variable engine operating parameters used to attain the set operating parameters. For example, to attain a particular engine speed and torque/load for a particular type of engine, the value or range of a combination of other variable parameters may need to be determined, referred to as determined operating parameters. Such other determined operating parameters may include, but are not limited to: the concentration of the oxygen introduced into the cylinder 62 for the combustion event, also referred to as the intake oxygen concentration ($O_2$); fuel pressure (FuP); start of injection/injection timing (SOI); and the fuel quantity ($m_f$). The steady state data points reflected in FIG. 3 were carried out based on a MaxxForce 15 engine that was certified for 2010 emissions, and which had a 15.2 L displacement, a inline 6-cylinder configuration, a bore by stroke of 5.6 inches by 6.75 inches, a dual stage turbocharger with intercooler and after-cooler air system, a Bosch common rail direct injection combustion system, and a rated horsepower of 550 HP.

The set operating parameters and the determined operating parameters may be used, such as in a local design of experiments (DOE), to determine or predict a level of $NO_x$ emission under those parameters, also referred to as a local $NO_x$ emission model. For example, the set and determined operating parameters may be used in a DOE test matrix for data collection. The measured $NO_x$ emission responses may then be used to create the local $NO_x$ emission model.

The DOE used to generate the local $NO_x$ model may be limited to data that falls within the operating and/or emission constraints of the corresponding engine. For example, brake specific fuel consumption (BSFC) model, which may be a measure of fuel efficiency within a shaft reciprocating engine, and pressure and temperature models may be employed to govern whether the particular set and determined operating parameters used in obtaining the local $NO_x$ emission model, and/or the local $NO_x$ emission model itself, is within the operating limits of the engine 10.

The DOE process may be repeated a number of times for different set operating parameters, and the associated determined operating parameters for those set parameters, so as to map a plurality of different local $NO_x$ emission models. FIG. 3 illustrates a map containing the steady state points for a plurality of the local $NO_x$ emission models for set engine speeds and loads/torques. At least some, if not all, of the plurality of local $NO_x$ emission models may then be used to generate a global $NO_x$ emission model. For accuracy purposes, a minimum number steady state points for various local $NO_x$ emission models may be required for the generation of the global $NO_x$ emission model. For example, according to certain embodiments, one or more the of the steady state points that correspond to local $NO_x$ emission models may be used in generating a global $NO_x$ emission model.

Various methods may be employed for the selection of which, if not all, of the mapped local $NO_x$ emission models are to be used in generating the global $NO_x$ emission model. For example, according to certain embodiments, the local $NO_x$ emission models to be used in generating a global $NO_x$ emission model may be selected based at least in part on a lug curve, a ramped mode cycle (such as using a 13 mode test cycle), and/or a Federal Test Procedure transient cycle that may be used for emission testing. Additionally, according to certain embodiments, particular local $NO_x$ emission models may be selected to capture specific engine operating conditions, such as, for example, operating conditions relating to high or low engine idling at different loads/torque, not-to-exceed (NTE) emissions, and different drive cycles, including city, severe service, and highway conditions, among others.

Figure 4:
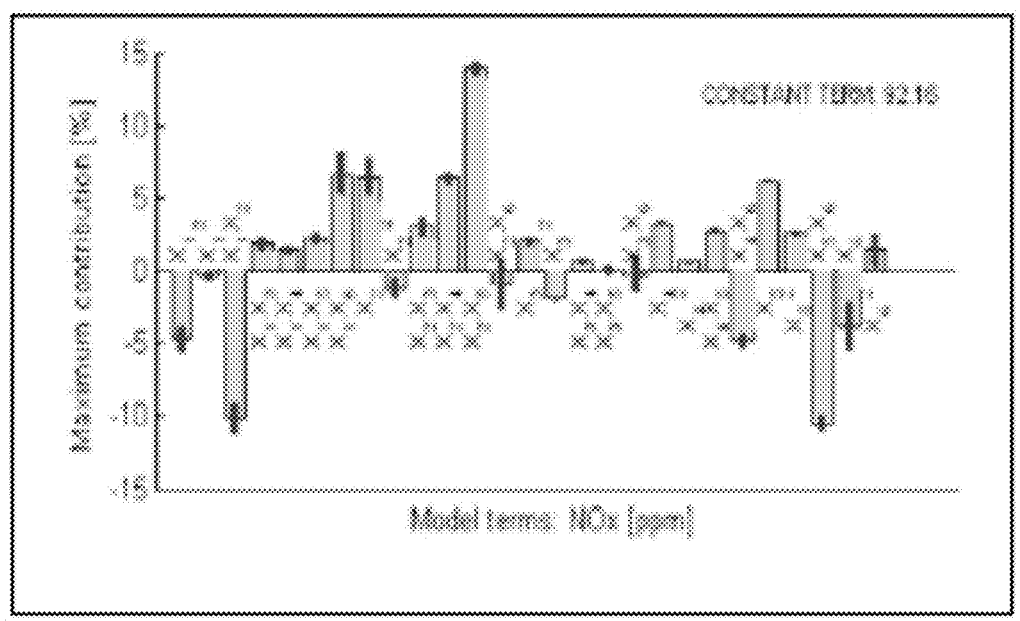
FIG. 4 illustrates a second order polynomial for a global NO$_x$ emission model for selected steady state data points.

The selected steady state data points from FIG. 3 may be represented in a global mathematical formula that is used to determine $NO_x$ formation at the various set and determined operating parameters. For example, FIG. 4 illustrates a global $NO_x$ emission model for the selected steady state data points, such as those shown in FIG. 3, that was generated using a numerical computation program, such as, for example, MATLAB® from Mathworks, Inc. As shown, the selected steady state data from the local $NO_x$ emission models shown in FIG. 3 have been translated into a second order polynomial that represents a global $NO_x$ emission model. More specifically, in this particular example, the second order polynomial mathematical model generated from the selected, mapped steady state data points from FIG. 3 is represented by the equation:

$$\text{Engine-out } NO_x \text{ level} = x_1 + x_1^2 + x_1 x_2 + x_1 x_3 + x_1 x_4 + x_1 x_5 + x_1 x_6 + x_2 + x_2^2 + x_2 x_3 + x_2 x_4 + x_2 x_5 + x_2 x_6 + x_3 + x_3^2 + x_3 x_4 + x_3 x_5 + x_3 x_6 + x_4 + x_4^2 + x_4 x_4^2 + x_4 x_5 + x_4 x_6 + x_5 + x_5^2 + x_5 x_6 + x_6 + x_6^2 \quad \text{(Eq. 6)}$$

where $x_1$ is engine speed, $x_2$ is engine load, $x_3$ is fuel pressure, $x_4$ is injection timing, $x_5$ is intake oxygen concentration, and $x_6$ is fuel quantity.

However, the particular formula that may be used to represent the global $NO_x$ emission model may vary based on a variety of different factors, including the size and configuration of the engine 10, and which operating parameters are, or are not, generally constant. For example, the above model utilized five different variable operating parameters. However, one or more of these five parameters may be relatively constant during at least some periods of engine 10 operation. In such situations, those relatively constant operating parameters may not be used in deriving the local $NO_x$ emission model, and thus by the global $NO_x$ emission model in predicting engine-out $NO_x$ emissions.

Figure 5:
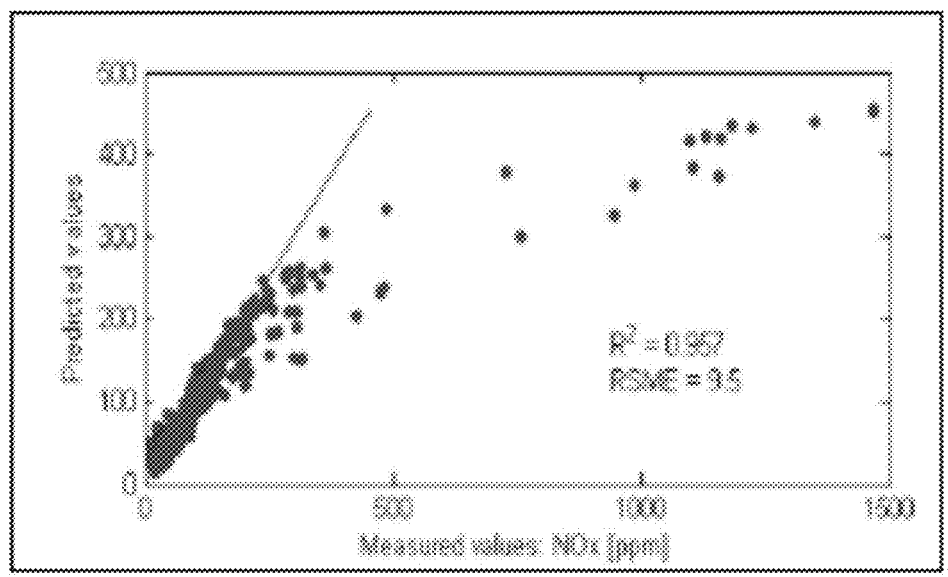
FIG. 5 illustrates a comparison of actual bench test data for NO$_x$ levels and predicted NO$_x$ levels using a second order polynomial for a global NO$_x$ emission model.

The accuracy of the global $NO_x$ emission model may be improved by increasing the polynomial degree or order of the formula of the model. For example, FIG. 5 illustrates a comparison of the actual test data and predicted $NO_x$ levels. The bench testing involved the use of a $NO_x$ sensor having accuracy ranges of +/−15 PPM for 0-100 PPM and +/−15% for 100-1500 PPM. The predicted $NO_x$ levels, represented by a line in FIG. 5, were derived using a second order polynomial of the model represented by Eq. 6. As shown, a large portion of the bench test data is aligned with, or is in close proximity to, the predicted $NO_x$ levels. Moreover, omitting some of the outer layer test data reveals that the second order polynomial of the global $NO_x$ emission model represented by Eq. 6 had a root mean square error of 9.5 with an accuracy of the correlation of 0.957.

Figure 6:
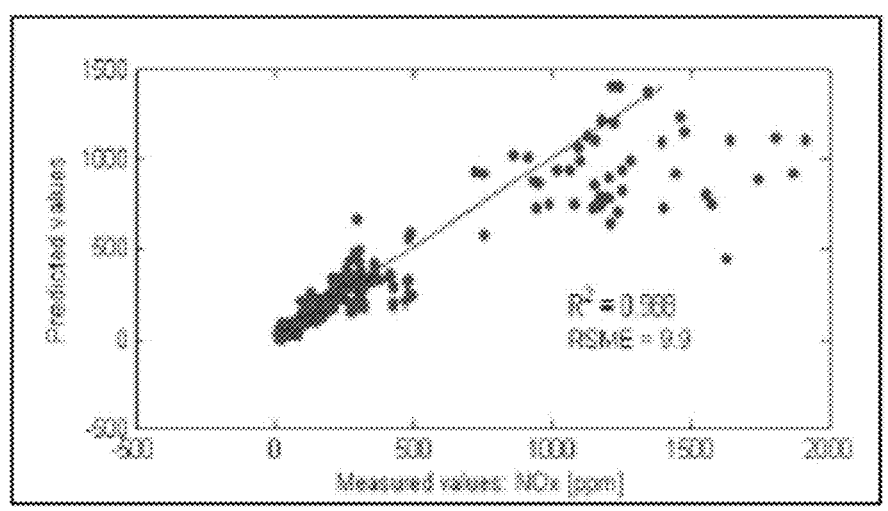
FIG. 6 illustrates a comparison of actual bench test data for NO$_x$ levels and predicted NO$_x$ levels using a third order polynomial for a global NO$_x$ emission model.

FIG. 6 provides a similar comparison as shown in FIG. 5, but for a third order polynomial. As shown, omitting some of the outer layer test data revealed the third order polynomial of the global $NO_x$ emission model obtained a root mean square error of 9.9, with an accuracy of the correlation of 0.988.

As previously mentioned, the ECU 26 may use the global $NO_x$ emission model to determine or predict engine-out $NO_x$ levels. While increasing the order of the polynomial of the formula used by the global $NO_x$ emission model may improve the accuracy of the model, the increased order may increase the number of polynomial coefficients. Such increases in polynomial coefficients may delay the speed at which the ECU 26 is able to determine the engine-out $NO_x$, and thereby interfere with the real time ability of the global $NO_x$ emission model.

The global $NO_x$ emission model of the present technology provides the ability to predict, in real time, variations in engine-out $NO_x$ emissions even when certain engine 10 operating parameters change. For example, a change in exhaust gas recirculation rate may vary the concentration of oxygen, which typically alters the level of $NO_x$ emissions. However, as the global $NO_x$ emissions model may include intake oxygen as at least one of the variable operating parameters used to determine $NO_x$ emission levels, the effect for a change, or failure, in exhaust gas recirculation rate or system may be accounted for by the global $NO_x$ emissions model. Thus, in this capacity, the global $NO_x$ emissions model has the capacity to predict or estimate $NO_x$ emission values even with issues or faults pertaining to engine combustion events.

The invention claimed is:

1. A method for controlling an aftertreatment device based on estimating an engine-out $NO_x$ content of exhaust gas produced by an internal combustion engine, without the need to determine cylinder pressure, the method comprising:

determining an engine speed and sending a signal indicative of the determined engine speed;

determining an engine load and sending a signal indicative of the determined engine load;

determining an intake oxygen level and sending a signal indicative of the determined intake oxygen level;

determining a fuel pressure and sending a signal indicative of the determined fuel pressure;

determining a fuel quantity and sending a signal indicative of the determined fuel quantity; and sending each of the signals indicative of the determined engine speed, engine load, intake oxygen level, fuel pressure, and fuel quantity to a control unit which is programmed to receive and process each of the signals indicative of determined engine speed, engine load, intake oxygen level, fuel pressure, and fuel quantity using a $NO_x$ model which utilizes a linear relationship between the intake oxygen level and engine-out NOx for the signal indicative of predetermined engine speed, and which utilizes a linear relationship between the intake oxygen level and engine-out NOx for the signal indicative of engine load, and which utilizes a linear relationship between the intake oxygen level and engine-out NOx for the signal indicative of intake oxygen level, and which utilizes a linear relationship between the intake oxygen level and engine-out NOx for the signal indicative of fuel pressure, and which utilizes a linear relationship between the intake oxygen level and engine-out NOx for the signal indicative of fuel quantity to arrive at an estimate of the engine-out $NO_x$ content; and controlling an aspect of the aftertreatment device based on the estimated engine-out NOx content.

2. The method of claim 1, wherein the $NO_x$ model applied by the control unit is based at least in part on a map emission response surface model that is a function of engine speed and engine torque.

3. The method of claim 1, wherein the $NO_x$ model applied by the control unit is based on a plurality of local $NO_x$ models that are generated using one or more set operating parameters and one or more variable operating parameters.

4. The method of claim 3, wherein the one or more variable operating parameters include at least one of the following: a local intake oxygen level; a local fuel pressure; and a local fuel quantity.

5. The method of claim 4, wherein the one or more set operating parameters include a constant engine speed and/or a constant engine torque.

6. The method of claim 5, wherein the plurality of local $NO_x$ models are derived using the design of experiments method.

* * * * *